United States Patent
Mo et al.

(10) Patent No.: US 8,331,970 B2
(45) Date of Patent: Dec. 11, 2012

(54) METHOD AND APPARATUS FOR DETERMINING SCANNED OBJECTS

(75) Inventors: Junxian Mo, Shenzhen (CN); David Comstock, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 228 days.

(21) Appl. No.: 12/763,802

(22) Filed: Apr. 20, 2010

(65) Prior Publication Data

US 2010/0202412 A1      Aug. 12, 2010

Related U.S. Application Data

(63) Continuation of application No. PCT/CN2008/072710, filed on Oct. 16, 2008.

(30) Foreign Application Priority Data

Oct. 20, 2007     (CN) .......................... 2007 1 0181371

(51) Int. Cl.
 *H04B 7/00*     (2006.01)
(52) U.S. Cl. ........ 455/515; 455/436; 455/437; 455/438; 455/444
(58) Field of Classification Search ........... 455/436–445
See application file for complete search history.

(56) References Cited

U.S. PATENT DOCUMENTS

| | | |
|---|---|---|
| 2005/0282547 A1 | 12/2005 | Kim et al. |
| 2006/0121903 A1 | 6/2006 | Lee et al. |
| 2007/0072615 A1 | 3/2007 | Kim et al. |

FOREIGN PATENT DOCUMENTS

| | | |
|---|---|---|
| CN | 1794823 A | 6/2006 |
| CN | 101010894 A | 8/2007 |
| CN | 101044702 A | 9/2007 |
| WO | 2006014063 A2 | 2/2006 |

OTHER PUBLICATIONS

IEEE 802.16e—2005—Part 16, tables 109h and 109i.*
"IEEE Standard for Local and Metropolitan Area Networks—Part 16: Air Interface for Fixed and Mobile Broadband Wireless Access Systems; Amendment 2: Physical and Medium Access Control Layers for Combined Fixed and Mobile Operation in Licensed Bands." IEEE Standard. Feb. 28, 2006:1-864.
International Search Report issued in corresponding PCT Application No. PCT/CN2008/072710; mailed Feb. 5, 2009.

(Continued)

*Primary Examiner* — Fayyaz Alam

(57) ABSTRACT

A method for determining scanned objects is disclosed. According to the method, a Mobile Station (MS) receives an MOB_NBR_ADV message sent by a Base Station (BS). The MOB_NBR_ADV message contains BS IDs. The method includes the following steps: setting a BS Bitmap field in a scanning process message; and mapping the BS Bitmap field to the BS IDs contained in the MOB_NBR_ADV message and determining scanned objects according to the mapping. With the method, a minimum of one bit may be mapped to one of the BS IDs, and thus scanned objects are determined. In addition, an apparatus containing BS Bitmap units is disclosed. When scanned objects are determined with the method and apparatus, the length of a scanning process message can be shortened, thus improving the air-interface resource usage of the wideband radio access system to a great extent.

7 Claims, 7 Drawing Sheets

| 1 | 2 | 3 | 4 | 5 | 6 | BS Bitmap | BS Bitmap scanning type | 10 | 11 | 12 | 13 | B | C |
|---|---|---|---|---|---|---|---|---|---|---|---|---|---|

OTHER PUBLICATIONS

IEEE Standard 802.16e™—2005: "Part 16: Air Interface for Fixed and Mobile Broadband Wireless Access Systems Amendment 2: Physical and Medium Access Control Layers for Combined Fixed and Mobile Operation in Licensed Bands," dated Feb. 28, 2006, 864 pages total.

Corresponding granted Chinese Patent No. CN101415203B (Application No. 200710181371.4), citing prior art at Item (56), issued Jun. 23, 2010, 1 page only.

Written opinion issued in corresponding PCT patent application No. PCT/CN2008/072710, dated Feb. 5, 2009, 3 pages total.

* cited by examiner

METHOD AND APPARATUS FOR DETERMINING SCANNED OBJECTS

CROSS-REFERENCE TO RELATED APPLICATIONS

This application is a continuation of International Application No. PCT/CN2008/072710, filed on Oct. 16, 2008, which claims priority to Chinese Patent Application No. 200710181371.4, filed on Oct. 20, 2007, both of which are hereby incorporated by reference in their entireties.

FIELD OF THE INVENTION

The present invention relates to wideband radio access technologies, and in particular, to a method and apparatus for determining scanned objects.

BACKGROUND OF THE INVENTION

A Worldwide Interoperability for Microwave Access (WIMAX) system, also called an 802.16 wireless Metropolitan Area Network (MAN), can cover a range of 25-30 miles in the data communication field.

The WIMAX technology is based on the wideband radio standards in the IEEE 802.16 series. Up to now, the IEEE 802.16 series include the IEEE802.16, IEEE802.16a, IEEE802.16c, IEEE802.16d, IEEE802.16e, IEEE802.16f, and IEEE802.16g standards. IEEE802.16, IEEE802.16a, and IEEE802.16d are fixed radio access air interface standards. IEEE802.16e is a mobile wideband radio access air interface standard. WIMAX adopts IEEE802.16e as its air interface standard.

IEEE802.16e is backward compatible with IEEE 802.16d. The physical layer implementation mode of IEEE 802.16e is similar to that of IEEE 802.16d. The main difference is that IEEE802.16e has extended Orthogonal Frequency Division Multiple Access (OFDMA) to meet the requirements for various carrier bandwidths. 802.16e has introduced many new features at the Media Access Control (MAC) layer to support mobility. The development trend of radio access technologies is to realize high capacity, wide coverage range, and mobility of the wideband radio systems by introducing new technologies, such as Orthogonal Frequency Division Multiplex (OFDM) and Multiple Input Multiple Output (MIMO) so that radio access technologies and 3G networks coexist and supplement each other. Therefore, IEEE 802.16e becomes a focus in the industry from its birth.

Based on IEEE 802.16e, WIMAX brings forward a new enhanced technology IEEE 802.16m. Currently, IEEE 802.16m has the following requirements: IEEE 802.16m can be used by mobile objects at the rate of over 350000 m/h; the maximum downlink data transmission rate is over 350 Mbps; the uplink data transmission rate is not smaller than 200 Mbps; the bandwidth is 5 MHz, 10 MHz, 20 MHz, and 40 MHz; a maximum of 4×4 MIMO may be used as planned. When a 20 MHz bandwidth and Time Division Duplex (TDD) are used for communications, the downlink and uplink area-based data transmission rates are 40 Mbps and over 12 Mbps respectively. In addition, the access time and handover delay of the data link layer are shorter than 10 ms and shorter than 20 ms respectively. IEEE 802.16m also needs to be compatible with IEEE 802.16e.

A WIMAX system includes Basic Stations (BSs) and Mobile Stations (MSs), which communicate through the electromagnetic waves transmitted and received by a wireless transceiver in wireless mode. Each BS is represented by a Basic Station Identity (BS ID) that is different from the BS IDs of other BSs, A BS ID is a 48-bit field. Each BS has its coverage range. A BS can communicate with the BSs in its coverage range. Each BS sends an MOB_NBR_ADV message to the BSs and MSs within a certain area regularly and saves the MOB_NBR_ADV message. The MSs receive and save the MOB_NBR_ADV message. The MOB_NBR_ADV message contains the BS IDs of the BSs in the area. The BS IDs are arranged in the MOB_NBR_ADV message in sequence. At the same time, one BS can communicate with multiple MSs in its coverage range, but one MS can communicate with only one BS at the same time, and this BS is called the serving BS of the MS. With the movement of an MS, the MS may pass through the coverage range of multiple BSs. In this case, the serving BS of the MS changes. The MS takes a BS that meets communication quality requirements as the serving BS to continue the communication, and this process is known as handover. To ensure communication continuity and reduce communication interruptions that may be caused by handover, an MS detects the signal quality of adjacent BSs continuously to determine a target BS for handover when the MS communicates with the current serving BS normally. This continuous detection process is called scanning. Thus, the MS can be handed over to a BS with better communication quality rapidly when handover is required. Therefore, scanning is a key process of ensuring successful handover.

A scanning process in a prior art is shown in FIG. 1. Messages in the scanning process are an MOB_SCN_RSP message and an MOB_SCN_REQ message. The MOB_SCN_RSP message may be sent by the serving BS of an MS to the MS actively, or be sent by the serving BS of the MS to the MS after the serving BS of the MS receives an MOB_SCN_REQ message from the MS. The BS notifies the MS of the scanning start time, scanning type, and BS ID information of the BSs to be scanned by sending the MOB_SCN_RSP message to the MS.

Both the MOB_SCN_RSP message and the MOB_SCN_REQ message contain BS ID information. The BS sends the MOB_SCN_RSP message containing BS ID information to the MS to notify the MS of the BSs to be scanned. The MS sends the MOB_SCN_REQ message containing BS ID information to the serving BS to notify the serving BS of the BSs to be scanned. Therefore, the BS ID information in the MOB_SCN_REQ message determines objects that will be scanned by the MS, and the BS ID information in the MOB_SCN_RSP message determines the objects that will be scanned by the BS. Both the MOB_SCN_RSP message and the MOB_SCN_REQ message still contain scanning type information. Each BS ID in the MOB_SCN_RSP and MOB_SCN_REQ messages is mapped to one scanning type.

The BS ID information in the MOB_SCN_RSP and MOB_SCN_REQ messages may be divided into two parts. The following takes the MOB_SCN_REQ message as an example to describe the BS ID information. The BS ID information in the MOB_SCN_RSP message is similar to the BS ID information in the MOB_SCN_REQ message.

The MOB_SCN_REQ message is sent from the MS to the serving BS of the MS. The BS ID information contained in the MOB_SCN_REQ message is divided into two parts. The first part of BS ID information corresponds to the BS ID information contained in an MOB_NBR_ADV message of the serving BS, and the second part of BS ID information is the BS IDs corresponding to the BSs that will be actively scanned by the MS but not contained in the MOB_NBR_ADV message.

IEEE802.16e adopts BS indexes to represent the first part of BS ID information; that is, IEEE802.16e represents the first part of BS ID information by specifying the sequence of the BS IDs contained in the MOB_NBR_ADV message that the MS requests to scan. The specific method is to set a BS Index field in a scanning process message.

Generally, the number of the BS IDs contained in the MOB_NBR_ADV message cannot exceed 255. Therefore, the BS Index field is represented by only eight bits.

IEEE802.16e adopts full BS IDs to map the second part of BS ID information; that is, IEEE802.16e uses 48-bit BS IDs to specify the BSs that the MS requests to scan. The second part of BS ID information is mapped by adopting full BS IDs rather than BS indexes because the BSs corresponding to the second part of BS ID information will be actively scanned by the MS but the BS IDs of the BSs are not contained in the MOB_NBR_ADV message.

According to the foregoing descriptions, the format of an MOB_SCN_REQ message in a prior art is shown in FIG. 2.

The MOB_SCN_REQ message includes various fields, which are represented by numbers or letters in FIG. 2. The following describes these fields.

Field 1 is a Management Message Type field with a length of eight bits.

Field 2 is a Scan duration field with a length of eight bits.

Field 3 is an Interleaving interval field with a length of eight bits.

Field 4 is a Scan iteration field with a length of eight bits.

Field 5 is an N_Recommended_BS_Index field with a length of eight bits. The field indicates the number of the BS IDs corresponding to the BSs that will be scanned by an MS and contained in an MOB_NBR-ADV message.

Field 6 is a Configuration change count for MOB_NBR-ADV field in an MOB_NBR_ADV message with a length of eight bits.

Field 7 is a Neighbor_BS_Index field with a length of eight bits. The field indicates the sequence of the BS IDs corresponding to the BSs that will be scanned by an MS in an MOB_NBR-ADV message.

Field 8 is a reserved field with a length of one bit.

Field 9 is a Scanning type field with a length of three bits. The field indicates the scanning type of the BS ID information mapped to field 7. There are four scanning types, namely, scanning type 0, scanning type 1, scanning type 2, and scanning type 3.

Field 10 is an N_Recommended_BS_Full field with a length of eight bits. The field indicates the number of the BSs that will be actively scanned by an MS.

Field 11 is a Recommended BS ID field with a length of 48 bits. The field indicates the BS IDs of the BSs that will be actively scanned by an MS.

Field 12 is a reserved field with a length of one bit.

Field 13 is a Scanning type field with a length of three bits. The field indicates the scanning types of the BS IDs mapped to field 11.

When the value of field 5 is 0, fields 6-9 and field A are absent.

The contents of field A are "n" times of the contents of fields 7-9 in sequence and "n" is equal to the value of field 5.

The content of field B is a repetition of the contents of fields 11-13 in sequence and the number of repetitions is equal to the value of field 10.

Field C is another field in an MOB_SCN_REQ message.

In a prior art, the format of an MOB_SCN_RSP message is shown in FIG. 3. The representation method is the same as FIG. 2; that is, fields 1-14 represent 14 fields represented by numbers in ascending order starting from field 1 and fields 15-18 represent four fields represented by numbers in ascending order starting from field 15. The following describes the fields shown in FIG. 3.

Field 1 is a Management Message Type field with a length of eight bits.

Field 2 is a Scan duration field with a length of eight bits.

Field 3 is a Report mode field with a length of two bits.

Field 4 is a reserved field with a length of six bits.

Field 5 is a Report period field with a length of eight bits.

Field 6 is a Report metric field with a length of eight bits.

Field 7 is a Start frame field with a length of eight bits.

Field 8 is an Interleaving interval field with a length of eight bits.

Field 9 is a Scan iteration field with a length of eight bits.

Field 10 is an N_Recommended_BS_Index field with a length of eight bits. The field indicates the number of the BS IDs corresponding to the BSs that will be scanned by a BS and contained in an MOB_NBR-ADV message.

The contents and meanings of fields 11-14 are the same as the contents and meanings of fields 6-9 in FIG. 2 respectively. Field D between field 14 and field A is present when the scanning type of field 14 is scanning type 2 or scanning type 3. Field D is 24 bits in length.

In FIG. 3, the content of field A is a repetition of the contents of fields 12-14 and field D in sequence and the number of repetitions is equal to the value of field 11; field D is between field 14 and field A.

Field 15 is an N_Recommended_BS_Full field with a length of eight bits. The field indicates the number of the BS IDs corresponding to the BSs that will be scanned by a BS but not contained in an MOB_NBR-ADV message.

Field 16 is a Recommended BS ID field with a length of 48 bits. The field indicates the BS IDs corresponding to the BSs that will be scanned by a BS but not contained in an MOB_NBR-ADV message.

Field 17 is a reserved field with a length of one bit.

Field 18 is a Scanning type field with a length of three bits. The field indicates the scanning types of the BS IDs mapped to field 16.

Field D between field 18 and field B is present when the scanning type of field 18 is scanning type 2 or scanning type 3. Field D is 24 bits in length.

In FIG. 3, the content of field B is a repetition of the contents of fields 16-18 and field D in sequence and the number of repetitions is equal to the value of field 15; field D is between field 18 and field B.

Field E is another field in an MOB_SCN_RSP message.

According to the foregoing technical solution, one part of BS ID information in a scanning process message corresponds to the BS IDs contained in an MOB_NBR_ADV message, and therefore, a prior art adopts the BS Index mode to map this part of BS ID information and determines scanned objects according to the mapping. When the BS Index mode is adopted to map BS ID information, and thereby scanned objects are determined, each BS requires only eight bits. When the Full BS ID mode is adopted, each BS requires 48 bits. Therefore, when the BS Index mode is adopted to map the first part of BS ID information, and thereby scanned objects are determined, the air-interface resource usage is improved to a certain extent. Because the air-interface resources are rare resources, it is urgent to find a solution to further improvement of the air-interface resource usage in the wideband radio access system.

SUMMARY OF THE INVENTION

Embodiments of the invention provide a method and apparatus for determining scanned objects to further improve the air-interface resource usage.

The above objective is achieved through the following technical solution:

A method for determining scanned objects, where an MS receives an MOB_NBR_ADV message containing BS IDs from a BS, includes the following steps: setting a BS Bitmap field in a scanning process message; and mapping the BS Bitmap field to the BS IDs contained in the MOB_N-BR_ADV message and determining scanned objects according to the mapping.

An apparatus for determining scanned objects includes a storing unit, which stores an MOB_NBR_ADV message. The apparatus further includes a BS Bitmap unit. The BS Bitmap unit obtains the BS IDs contained in the MOB_NBR_ADV message and their sequence. The BS Bitmap unit maps the BS IDs contained in the MOB_NBR_ADV message according to the BS IDs and their sequence, and then determines scanned objects according to the mapping.

According to the foregoing technical solution, in the method for determining scanned objects, a BS Bitmap mode is adopted for the first part of BS ID information in a scanning process message. Thus, one BS ID may be indicated by less than eight bits (but one BS ID is indicated by eight bits when the BS Index mode is adopted). Therefore, when the BS Bitmap mode is adopted to map the first part of BS ID information and when scanned objects are determined according to the mapping, the air-interface resource usage may be further improved. The apparatus provided in the embodiments of the invention includes a BS Bitmap unit. Therefore, when the apparatus is used to determine scanned objects, the air-interface resource usage can be further improved.

DETAILED DESCRIPTION OF THE INVENTION

For better understanding of the objective, technical solution and merits of the invention, the invention is hereinafter described in detail with reference to accompanying drawings and exemplary embodiments.

In the first exemplary embodiment, the first part of BS ID information is mapped by adopting the BS Bitmap mode and scanned objects are determined according to the mapping.

The specific method used to map the first part of BS ID information by adopting the BS Bitmap mode is to set a BS Bitmap field in a scanning process message. When the BS Bitmap mode is adopted to map the first part of BS ID information, the format of an MOB_SCN_REQ message is shown in FIG. 4.

Figure 1:
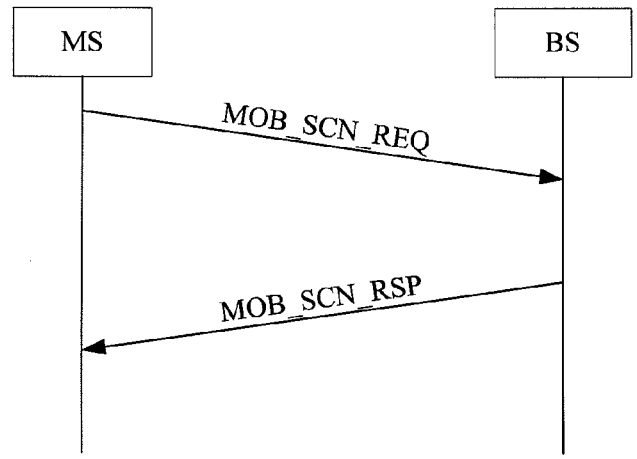
FIG. 1 is a scanning flowchart in a prior art.
Figure 2:
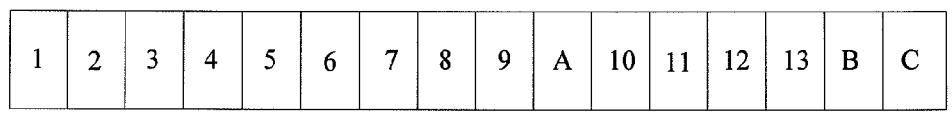
FIG. 2 shows a format of an MOB_SCN_REQ message in a prior art.
Figure 3:
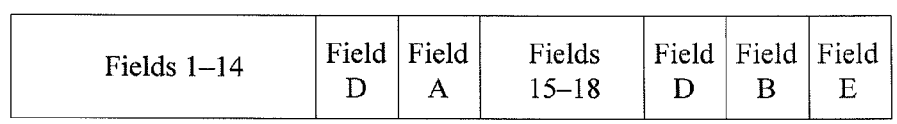
FIG. 3 shows a format of an MOB_SCN_RSP message in a prior art.
Figure 4:
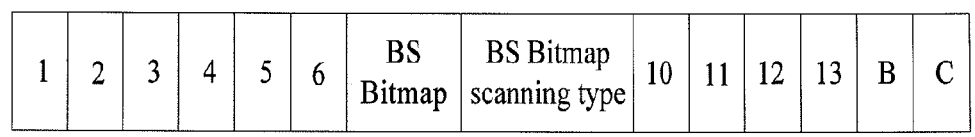
FIG. 4 shows a format of an MOB_SCN_REQ message in a first exemplary embodiment of the invention.

According to field labels, the contents and meanings of fields 1-6 and fields 10-C in FIG. 4 are the same as the contents and meanings of fields 1-6 and fields 10-C in FIG. 2 in a prior art. The length of the BS Bitmap field is equal to the number of the BS IDs contained in an MOB_NBR_ADV message. In the BS Bitmap field, each bit corresponds to one BS ID, and the bits in the BS Bitmap field correspond to the BS IDs according to the sequence of the BS IDs contained in the MOB_NBR_ADV message. The sequence of the bits in the BS Bitmap field corresponds to the sequence of the BS IDs contained in the MOB_NBR_ADV message. For example, assume that the first bit in the BS Bitmap field corresponds to the first BS ID in the MOB_NBR_ADV message; that is, the location of each bit in the BS Bitmap field corresponds to the sequence of each BS ID in the MOB_N-BR_ADV message. Each bit in the BS Bitmap field is set to 0 or 1 to indicate whether an MS requests to scan a BS indicated by a BS ID that the bit is mapped to in the MOB_NBR_ADV message. For example, if the first bit in the BS Bitmap field is set to 1, it indicates that an MS requests to scan the BS indicated by the first BS ID in the MOB_NBR_ADV message. According to the descriptions of the BS Bitmap field, when the BS Bitmap mode is adopted to map the first part of BS ID information, the objects scanned by an MS or BS can be determined.

Each bit in a BS Bitmap scanning type field indicates a scanning type. From the start bit of the scanning type field, every three bits indicate one scanning type, and the sequence of scanning types corresponds to the value and sequence of each bit in the BS Bitmap field. The following describes the information with reference to FIG. 5.

Figure 5:
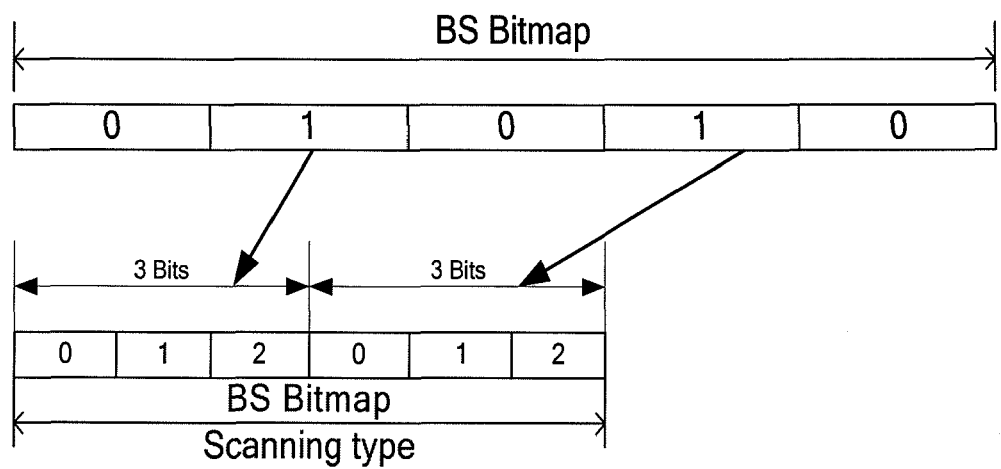
FIG. 5 shows a mapping between the BS Bitmap scanning field and the BS Bitmap field shown in FIG. 4.

In FIG. 5, the length of a BS Bitmap field is 5 bits, which indicates that the number of the BS IDs contained in an MOB_NBR_ADV message is 5. In FIG. 5, the first bit is mapped to the first BS ID in the MOB_NBR_ADV message, and the mapping relation between other bits and the BS IDs contained in the MOB_NBR_ADV message is similar to the first bit. In FIG. 5, if the value of a bit is 1, it indicates that an MS requests to scan a BS indicated by the BS ID that the bit is mapped to and the bit corresponds to a scanning type of three bits. The scanning types corresponding to the bits whose value is 1 in the BS Bitmap field are arranged according to the sequence of the bits. As shown in FIG. 5, the values of the second bit and the fourth bit in the BS Bitmap field are 1; the scanning type corresponding to the second bit is represented by the left first three bits in the BS Bitmap scanning type field; and the scanning type corresponding to the fourth bit is represented by the left second three bits in the BS Bitmap scanning type field. "0", "1", and "2" in the BS Bitmap scanning type field in FIG. 5 indicate that the bits are the zeroth bit, first bit, and second bit of the three bits respectively.

In actual applications, the length of the BS Bitmap field may be shorter than the number of the BS IDs. In this case, one bit in the BS Bitmap field corresponds to multiple BS IDs in the BS ID information. That is, when a scanning process message contains one or more BS IDs, the bits corresponding to multiple BS IDs are set to specified values. The length of the BS Bitmap field may also be longer than the number of the BS IDs. In this case, multiple bits in the BS Bitmap field correspond to one BS ID in the BS ID information. When the length of the BS Bitmap field is shorter or longer than the number of the BS IDs, the usage of the BS Bitmap field is similar to the usage of the BS Bitmap field in the case that the length of the BS Bitmap field is equal to the number of the BS IDs. Reserved bits may also be set in the BS Bitmap field, and these reserved bits are not used to map the BS ID information.

Figure 6:
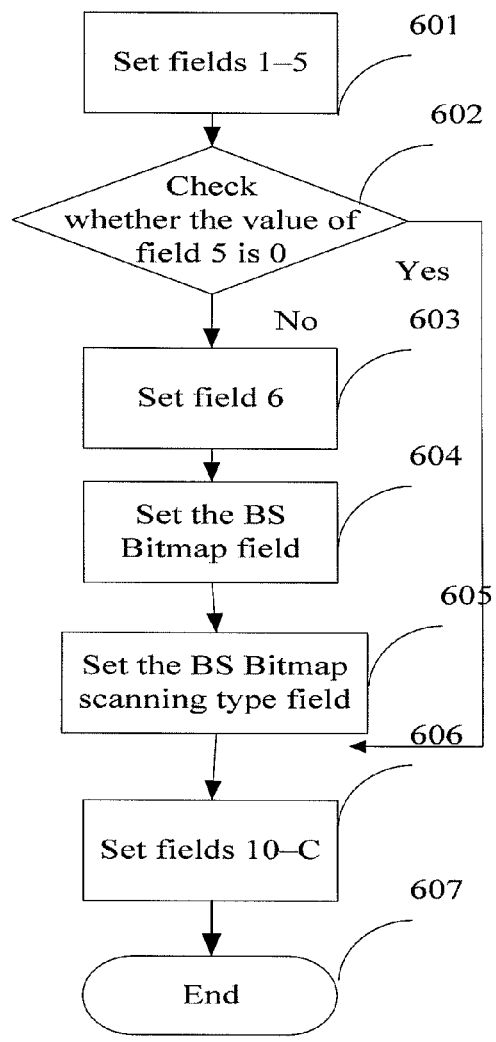
FIG. 6 is a flowchart of setting an MOB_SCN_REQ message in the first exemplary embodiment of the invention.

The flowchart of setting the format of an MOB_SCN_REQ message shown in FIG. 4 is shown in FIG. 6.

Step 601: Set fields 1-5.
Step 602: Check whether the value of field 5 is 0. If yes, go to step 606; otherwise, go to step 603.
Step 603: Set field 6.
Step 604: Set the BS Bitmap field.
Step 605: Set the BS Bitmap scanning type field.
Step 606: Set fields 10-C.
Step 607: The process of setting is complete.

In the preceding steps, the methods for setting the fields in steps 601, 603, and 606 are the same as the methods in a prior art. For the methods for setting the fields in steps 604 and 605, see the related descriptions in embodiments of the invention.

In this embodiment, for the format of an MOB_SCN_RSP message and the process of setting, see the related descriptions of an MOB_SCN_REQ message.

In this embodiment, the BS Bitmap mode is adopted to map a minimum of one bit to one BS ID. In a prior art, the BS Index mode is adopted to map eight bits to one BS ID. Assume that the number of the BS IDs contained in an MOB_NBR_ADV message is N1 and that the number of BS IDs corresponding to the BSs that an MS requests to scan is N2. The BS IDs contained in an MOB_SCAN_REQ message sent by the MS are discrete; that is, not all BS IDs contained in the MOB_NBR_ADV message are contained in the MOB_SCAN_REQ message. Therefore, N2 is generally smaller than N1.

Based on the first exemplary embodiment, the second exemplary embodiment further provides an indication field. The indication field indicates whether the current scanning process message adopts the BS Bitmap or BS Index mode.

According to the first exemplary embodiment, when N2 is far smaller than N1 (for example, the value of N2 is 5, and the value of N1 is 100) and when the BS Index mode is adopted to indicate the first part of BS ID information, the air-interface resources are further saved. Therefore, based on the first exemplary embodiment, the second exemplary embodiment further uses an indication field to determine the mode that is adopted by the current scanning process message for mapping the first part of BS ID information. After the mode is determined, the scanning process message adopts the mode to map the first part of BS ID information. Note that the scanning process message can adopt only one mode, namely, the BS Index or BS Bitmap mode, but the scanning process message can select the most proper mode according to the actual situation. The indication field may be an FMT bit, a field that contains multiple bits, or a bit in the field.

Figure 7:
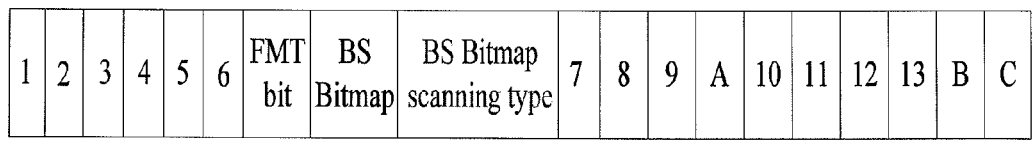
FIG. 7 shows a format of an MOB_SCN_REQ message in a second exemplary embodiment of the invention.

FIG. 7 shows the format of an MOB_SCN_REQ message in the second exemplary embodiment.

According to field labels, the contents and meanings of fields 1-4 and fields 7-C in FIG. 7 are the same as the contents and meanings of fields 1-4 and fields 7-C in FIG. 2. The contents of field 5, field 6, the BS Bitmap field, and the BS Bitmap scanning type field in FIG. 7 are the same as the contents of the fields with the same flags in FIG. 4. In FIG. 7, when the value of field 5 is 0, fields 6-A are absent. The value of the FMT bit determines whether to adopt the BS Bitmap or BS Index mode to map the first part of BS ID information. The following describes the usage of the FMT bit through an example. Assuming that the BS Bitmap mode is adopted when the value of the FMT bit is 0 and that the BS Index mode is adopted when the value of the FMT bit is 1, then fields 7-A are absent when the value of the FMT bit is 0, and the BS Bitmap field and the scanning type field are absent when the value of the FMT bit is 1.

Figure 8:
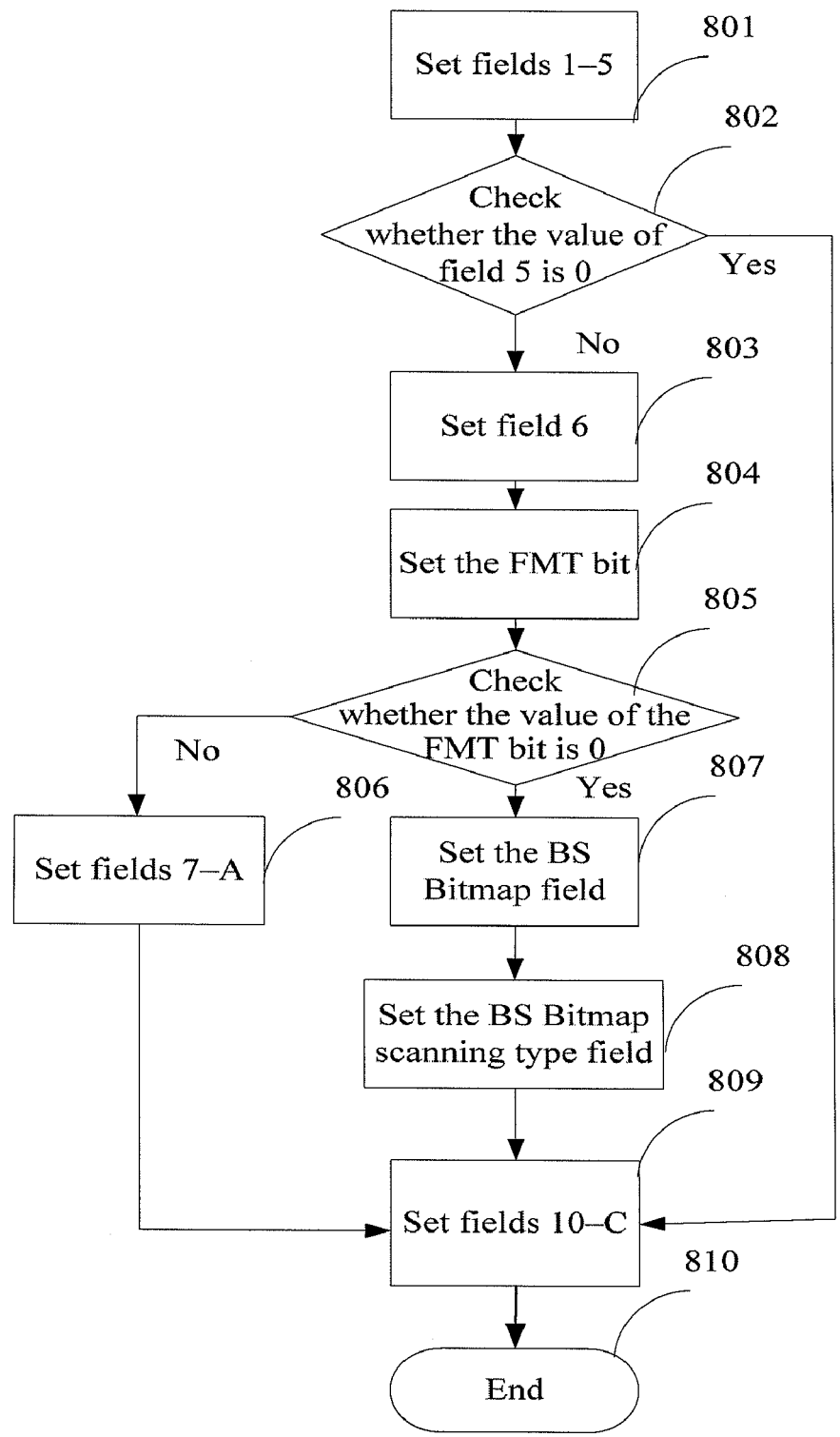
FIG. 8 is a flowchart of setting an MOB_SCN_REQ message in the second exemplary embodiment of the invention.

The flowchart of setting the format of an MOB_SCN_REQ message shown in FIG. 7 is shown in FIG. 8.

Step 801: Set fields 1-5.
Step 802: Check whether the value of field 5 is 0. If yes, go to step 809; otherwise, go to step 803.
Step 803: Set field 6.
Step 804: Set the FMT bit.
Step 805: Check whether the value of the FMT bit is 0. If yes, go to step 807; otherwise, go to step 806.
Step 806: Set fields 7-A.
Step 807: Set the BS Bitmap field.
Step 808: Set the BS Bitmap scanning type field.
Step 809: Set fields 10-C.
Step 810: The process of setting is complete.

In the preceding steps, the methods for setting the fields in steps 801, 803, 806, and 809 are the same as the methods in a prior art. For the methods for setting the fields in steps 807 and 808, see the related descriptions in the first exemplary embodiment of the invention. For the methods for setting the fields in steps 804 and 805, see the related descriptions in embodiments of the invention.

Based on the first exemplary embodiment, the method for setting an indication filed in an MOB_SCN_RSP message is the same as the method for setting an indication filed in an MOB_SCN_REQ message. For example, the FMT bit may be set as the indication field. For the specific method for setting the indication field, see the related descriptions in this embodiment. In this embodiment, for the process of setting the format of an MOB_SCN_RSP message, see the process of setting the format of an MOB_SCN_REQ message.

According to the second exemplary embodiment, the third exemplary embodiment uses an existing field in an existing scanning process message as an indication field so that the scanning process message described in embodiments of the invention is compatible with the existing scanning process message.

In this embodiment, the indication field may be the N_Recommended_BS_Index field. The field is eight bits in length, and indicates a maximum of 255 BS IDs. In fact, it is impossible that an MOB_NBR_ADV message contains so many BS IDs. The length of the field is set to eight bits so as to align bytes. Therefore, this embodiment uses the N_Recommended_BS_Index field as the indication field. The specific method is as follows: when the value of the field is 255, the scanning process message adopts the BS Bitmap mode; when the value of the field is not 255, the scanning process message adopts the BS Index mode. Furthermore, when the BS Index mode is adopted, the meaning of the N_Recommended_BS_Index field does not change; that is, the N_Recommended_BS_Index field still indicates the number of the BS IDs contained in an MOB_NBR_ADV message. In actual applications, when the value of the N_Recommended_BS_Index field is any other specified value, the BS Bitmap mode is adopted to map the first part of BS ID information in the scanning process message; and when the value of the N_Recommended_BS_Index field is not the specified value, the BS Index mode is adopted to map the first part of BS ID information in the scanning process message. For the usage of the N_Recommended_BS_Index field in actual applications, see the related descriptions in this embodiment.

Figure 9:
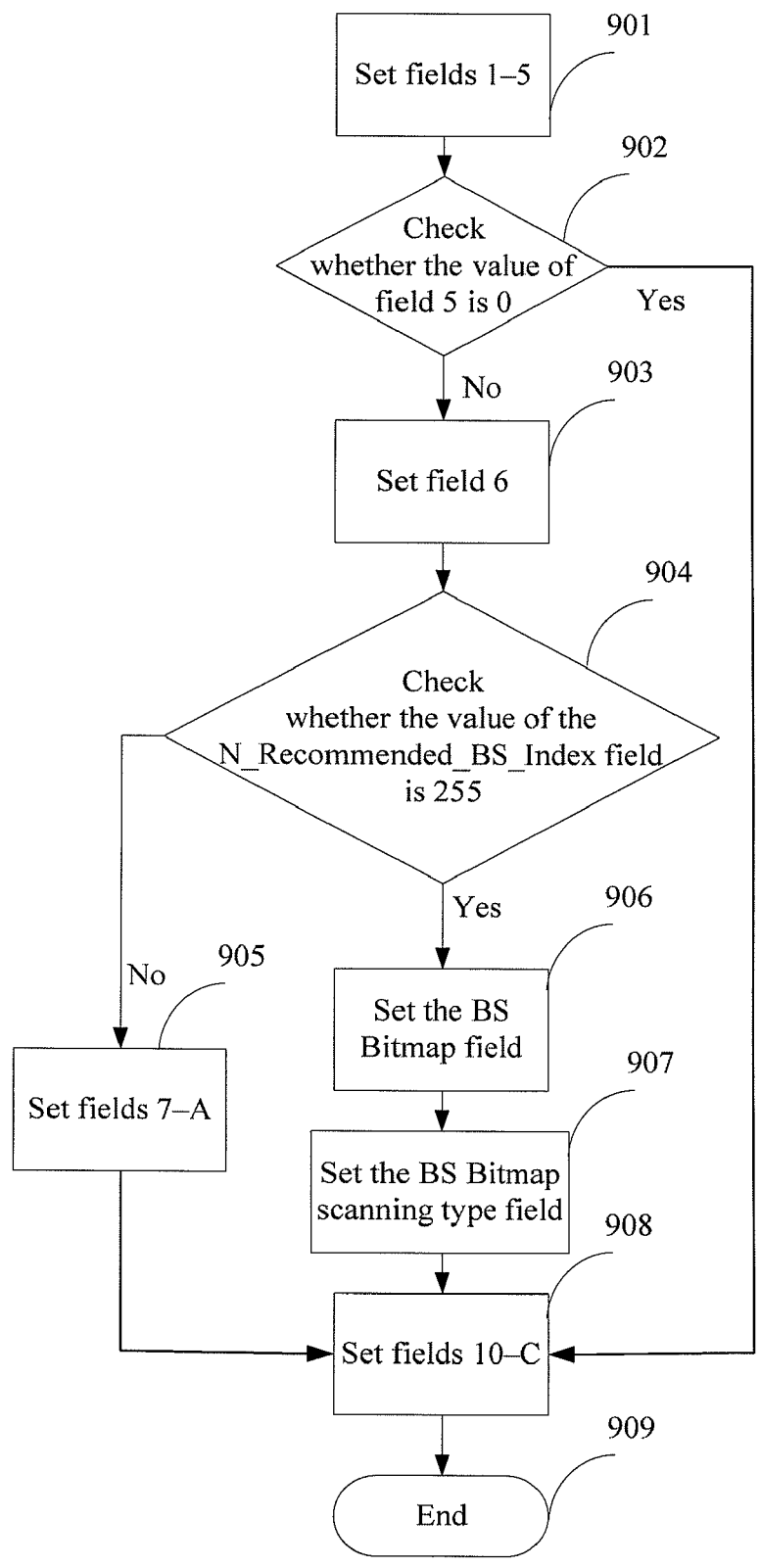
FIG. 9 is a flowchart of setting an MOB_SCN_REQ message in a third exemplary embodiment of the invention.

When the N_Recommended_BS_Index field is used as an indication field, the flowchart of setting an MOB_SCN_REQ message is shown in FIG. 9.

According to FIG. 8 and FIG. 9, for the contents and execution of steps 901-903 and steps 905-909, see the contents and execution of steps 801-803 and steps 806-810.

Step 904: Check whether the value of the N_Recommend_BS_Index field is 255. If yes, go to step 906; otherwise, go to step 905.

In this embodiment, for the process of setting an MOB_SCN_RSP message, see the process of setting an MOB_SCN_REQ message.

Similarly, the Scan duration field, Interleaving interval field, or Scan Iteration field in an existing scanning process message may also be used as an indication field. Any of the above fields may be used as an indication field. When the values of the fields are specified values, the scanning process message adopts the BS Bitmap mode to map the first part of BS ID information. When the fields are set to other values, the scanning process message adopts the BS Index mode to map the first part of BS ID information. The specific method for using another field in the existing scanning process message as an indication field is similar to the method for using the N_Recommended_BS_Index field as the indication field.

The fourth exemplary embodiment provides an apparatus for determining scanned objects.

The apparatus includes a storing unit, which stores an MOB_NBR_ADV message. The apparatus further includes a BS Bitmap unit. The BS Bitmap unit obtains the BS IDs contained in the MOB_NBR_ADV message and their sequence. The BS Bitmap unit maps the BS IDs contained in the MOB_NBR_ADV message according to the BS IDs and their sequence, and then determines scanned objects according to the mapping.

Preferably, the BS Bitmap unit includes BS Bitmap subunits. The location of the BS Bitmap subunits corresponds to the sequence of the BS IDs mapped by the BS Bitmap subunits in the MOB_NBR_ADV message. The BS Bitmap subunits are set to determine scanned objects.

Preferably, the number of the BS Bitmap subunits is equal to the number of the BS IDs contained in the MOB_NBR_ADV message.

The foregoing apparatus further includes an indicating unit. The content of the indicating unit indicates whether the apparatus uses BS Bitmap units or BS Index units to determine scanned objects.

The apparatus in this embodiment is hereinafter described in detail with reference to FIG. 10.

Figure 10:
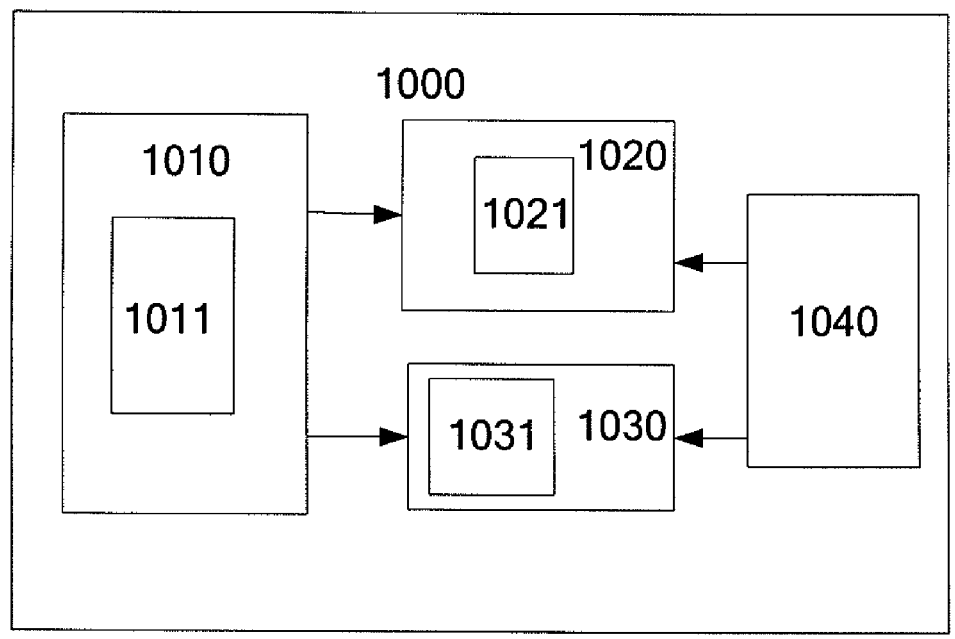
FIG. 10 is a structure of an apparatus in a fourth exemplary embodiment of the invention.

In FIG. 10, the apparatus is represented by 1000; the storing unit is represented by 1010; the BS ID storing subunit is represented by 1011; the BS Bitmap unit is represented by 1020; the BS Bitmap subunit is represented by 1021; the BS Index unit is represented by 1030; the BS Index subunit is represented by 1031; and the indicating unit is represented by 1040.

The storing unit 1010 stores an MOB_NBR_ADV message. The BS ID storing subunit 1011 stores the BS IDs contained in an MOB_NBR_ADV message. The number of the BS ID storing subunits is the same as the number of the BS IDs. The arrangement sequence of the BS ID storing subunits is the same as the sequence of the BS IDs. The BS Bitmap unit 1020 contains BS Bitmap subunits 1021 and there may be one or multiple BS Bitmap subunits.

The BS Bitmap unit 1020 obtains the contents of each BS ID storing subunit 1011 in the storing unit 1010 and the sequence of the BS ID storing subunits 1011. Each BS ID storing subunit 1011 corresponds to one BS Bitmap subunit 1021. According to the contents and sequence of the BS ID storing subunits 1011, the BS Bitmap subunits 1021 are set and arranged so that the BS ID storing subunits 1011 are mapped to the BS Bitmap subunits 1021.

The BS Index unit 1030 contains BS Index subunits 1031. The BS Index subunits 1031 are set according to the sequence of the BS ID storing subunits 1011. The contents of the BS Index subunits 1031 determine scanned objects. The number of the BS Index subunits 1031 determines the number of scanned objects.

The indicating unit 1040 sends its contents to the BS Bitmap unit 1020 and the BS Index unit 1030. According to the indication information, the apparatus 1000 decides to use the BS Bitmap unit 1020 or BS Index unit 1030 to determine scanned objects.

In FIG. 10, the BS Index unit 1030 and the indicating unit 1040 are optional.

In this embodiment, for the internal structures of the BS Bitmap unit, BS Index unit, indicating unit, and other units contained in this apparatus, see the setting methods provided in embodiments of the invention.

The fifth exemplary embodiment provides a system for determining scanned objects.

The system includes an MS and a BS. The BS sends an MOB_NBR_ADV message to the MS and saves the MOB_NBR_ADV message. The MS receives the MOB_NBR_ADV message and saves the MOB_NBR_ADV message. The system further includes a BS Bitmap unit, which is in the MS and in the BS. The BS Bitmap unit obtains the sequence of the BS IDs contained in the MOB_NBR_ADV message. The BS Bitmap unit maps the BS IDs contained in the MOB_NBR_ADV message and determines scanned objects according to the mapping.

Preferably, the BS Bitmap unit includes subunits. The location of the subunits corresponds to the sequence of the BS IDs mapped by the subunits in the MOB_NBR_ADV message. The values of the subunits indicate whether a scanning process message contains the BS IDs mapped by the subunits.

Preferably, the number of the subunits is equal to the number of the BS IDs contained in the MOB_NBR_ADV message.

The foregoing system further includes an indicating unit. The indicating unit indicates whether the system contains a BS Bitmap unit or a BS Index unit.

Preferably, the indicating unit is an existing unit of a scanning system in the prior art; for example, the indicating unit is an N_Recommended_BS_Index unit, Scan duration unit, Interleaving interval unit, or Scan iteration unit. Preferably, the indicating unit is an existing unit of the scanning system; for example, the indicating unit is an N_Recommended_BS_Index unit, a Scan duration unit, an Interleaving interval unit, or a Scan iteration unit in an existing scanning process message.

The system in this embodiment is hereinafter described in detail with reference to FIG. 11.

Figure 11:
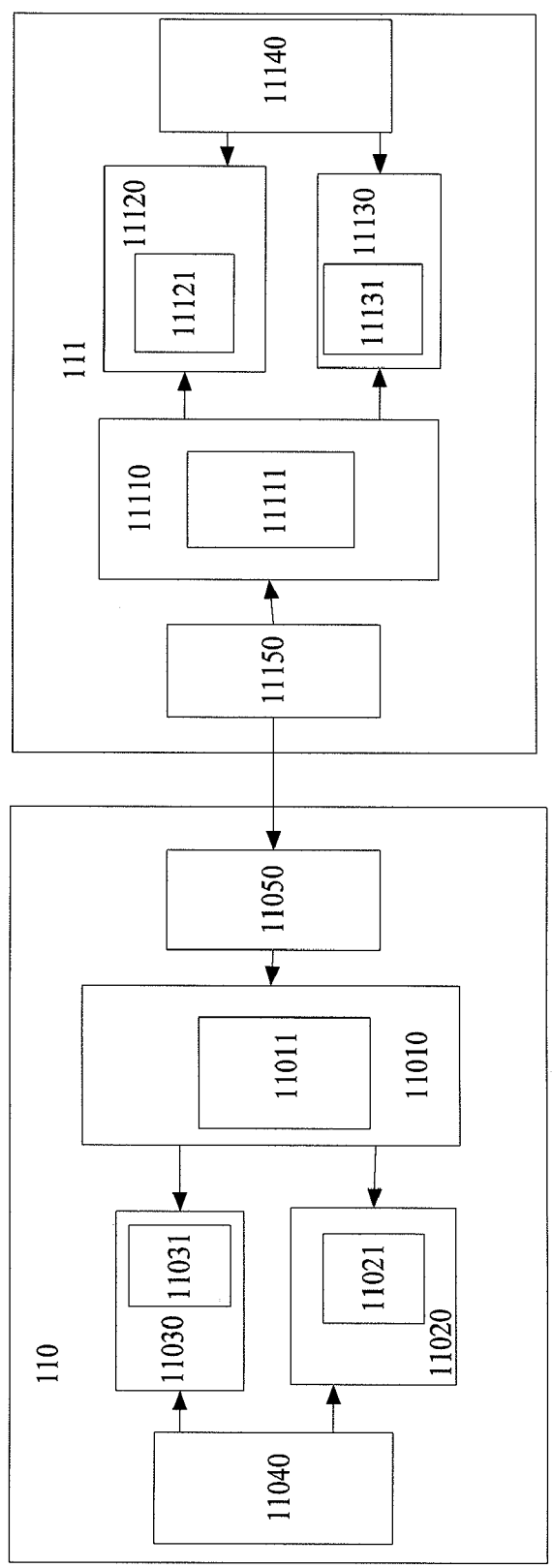
FIG. 11 is a structure of a system in a fifth exemplary embodiment of the invention.

In FIG. 11, an MS is represented by 110; a BS is represented by 111; a receiving unit of the MS is represented by 11050; a sending unit of the BS is represented by 11150; a storing unit is represented by 11010; a BS ID storing subunit is represented by 11011; a BS Bitmap unit is represented by 11020; a BS Bitmap subunit is represented by 11021; a BS Index unit is represented by 11030; a BS Index subunit is represented by 11031; and an indicating unit is presented by 11040. In FIG. 11, the last two numbers used to represent the units in the BS 111 are the same as the last two numbers in the MS 110, and the structures, functions, and connection modes of the units in the BS 111 are the same as the structures, functions, and connection modes of the units in the MS 110. Moreover, the structures, functions, and connection modes of the units in the BS 111 shown in FIG. 11 are the same as the structures, functions, and connection modes of the units shown in FIG. 9, in which the last two numbers used to present the units are the same as the last two numbers in the BS 111 shown in FIG. 11. For details, see the related descriptions in FIG. 9.

The sending unit 11150 sends an MOB_NBR_ADV message to the MS 110 and saves the MOB_NBR_ADV message to the storing unit 11110. The receiving unit 11050 receives the MOB_NBR_ADV message. The storing unit 11010 obtains the MOB_NBR_ADV message received by the receiving unit 11050 and saves the MOB_NBR_ADV message.

In FIG. 11, the units 11040, 11030, 11031, 11130, 11131, and 11140 are optional.

For the related contents, such as the internal structures of the BS Bitmap unit, BS Index unit, indication unit, and other units contained in the system in this embodiment, see the setting methods provided in embodiments of the invention.

According to the foregoing solution, in embodiments of the invention, the BS Bitmap mode is adopted to map the first part of BS ID information in a scanning process message. Thus, less than eight bits can be mapped to one BS ID. When the number of the bits in the BS Bitmap field is equal to the number of the BS IDs contained in the MOB_NBR_ADV message and when the BS Bitmap mode is adopted, one bit can be mapped to one BS ID; when the BS Index mode is adopted, eight bits are mapped to one BS ID. Therefore, when the BS Bitmap mode is adopted to map the first part of BS ID information, the air-interface resource usage may be further improved.

In embodiments of the invention, an indication field is further set to indicate whether the current scanning process message adopts the BS Bitmap or BS Index mode to map the first part of BS ID information. Thus, different modes are selected for different application scenarios for mapping the first part of BS ID information, thus maximizing the air-interface resource usage.

In embodiments of the invention, an existing field in an existing scanning process message is used as an indication field so that the scanning process message in the embodiments of the invention is compatible with the existing scanning process message.

Those skilled in the art may understand that all or part of the steps in the foregoing embodiments may be completed by hardware following instructions of a program. The program may be stored in a computer readable storage medium such as a read-only memory (ROM), a random access memory (RAM), a magnetic disk, or a compact disk (CD).

The apparatus and system provided in embodiments of the invention includes a BS Bitmap unit. Therefore, the length of a scanning process message that is sent or received by the BS Bitmap unit is shortened, and thus the air-interface resource usage can be further improved.

Although the invention has been described through some exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the following claims or their equivalents.

The invention claimed is:

1. A method for identifying base stations for scanning, comprising:
   selecting, by a mobile station (MS), at least one base station (BS) in a plurality of BSs available to the MS for scanning; and
   requesting, by the MS, to scan the selected BS by sending a mobile scan request MOB_SCN_REQ message to its serving base station,
   wherein the MOB_SCN_REQ message carries a first BS Bitmap field, the first BS Bitmap field being configured to include a plurality of bits, and
   wherein for each bit in the plurality of bits, a position of the bit is configured to identify one BS in a plurality of BSs available to the MS for scanning, and a value of the bit is configured to indicate whether the available BS is selected by the MS for scanning.

2. The method according to claim 1, wherein a quantity of bits of the BS Bitmap field equals a quantity of the BS IDs.

3. The method according to claim 1, further comprising the step of:
   identifying, by the MS, the BS for scanning according to a response received from the serving BS.

4. The method according to claim 1, further comprising the steps of:
   receiving, by the MS, a mobile scanning response message MOB_SCN_RSP from the serving BS identifying which of the plurality of available BS are selected by the serving BS for scanning;
   wherein the MOB_SCN_RSP message carries a second BS Bitmap field,
   wherein the second BS Bitmap field is configured to provide a mapping identifying the plurality of BSs available to the MS and whether each identified BS is selected by the serving BS to be scanned by the MS.

5. A mobile station (MS) comprising:
   a processor configured to select at least one base station (BS) in a plurality of BSs available to the MS for scanning; and
   a transceiver communicatively connected to the processor, the transceiver being configured to request to scan the selected BS by sending a mobile scan request MOB_SCN_REQ message to its serving base station,
   wherein the MOB_SCN_REQ message carries a first BS Bitmap field, the first BS Bitmap field being configured to include a plurality of bits, and
   wherein, for each bit in the plurality of bits, a position of the bit is configured to identify one BS in a plurality of BSs available to the MS for scanning, and a value of the bit is configured to indicate whether the available BS is selected by the MS for scanning.

6. The MS according to claim 5, wherein the processor is further configured to identify the BS for scanning according to a response received from the serving BS.

7. The MS according to claim 5, wherein the transceiver is configured to receive a mobile scanning response message MOB_SCN_RSP from the serving BS identifying which of the plurality of available BS are selected by the serving BS for scanning;
   wherein the MOB_SCN_RSP message carries a second BS Bitmap field,
   wherein the second BS Bitmap field is configured to provide a mapping identifying the plurality of BSs available to the MS and whether each identified BS is selected by the serving BS to be scanned by the MS.

* * * * *